United States Patent
Alperovich et al.

[11] Patent Number: 5,819,180
[45] Date of Patent: Oct. 6, 1998

[54] AUTOMATIC CALL GENERATOR WITH A MOBILE TELECOMMUNICATIONS NETWORK BASED UPON MOBILE SUBSCRIBER'S LOCATION

[75] Inventors: Vladimir Alperovich, Dallas; Eric Valentine, Plano, both of Tex.

[73] Assignee: Ericsson Inc., Research Triangle Park, N.C.

[21] Appl. No.: 690,560

[22] Filed: Jul. 31, 1996

[51] Int. Cl.[6] .......................... H04M 11/00; H04M 1/64; H04Q 7/00; H04Q 7/38
[52] U.S. Cl. .......................... 455/465; 455/433; 455/435; 455/432
[58] Field of Search .................. 455/432, 433, 455/434, 435, 456, 457, 459, 426, 462, 466

[56] References Cited

U.S. PATENT DOCUMENTS

| | | | |
|---|---|---|---|
| 5,255,307 | 10/1993 | Mizikovsky | 379/59 |
| 5,307,399 | 4/1994 | Dai et al. | 455/426 |
| 5,353,331 | 10/1994 | Emerey et al. | 379/58 |
| 5,673,308 | 9/1997 | Akhaven | 379/61 |
| 5,675,629 | 10/1997 | Raffel et al. | 379/58 |

FOREIGN PATENT DOCUMENTS

| | | |
|---|---|---|
| 0 308 204 A2 | 3/1989 | European Pat. Off. . |
| 2 296 409 A | 6/1996 | United Kingdom . |

*Primary Examiner*—David R. Hudspeth
*Assistant Examiner*—M. David Sofocleous
*Attorney, Agent, or Firm*—Jenkens & Gilchrist

[57] ABSTRACT

A mobile subscriber enters a service code followed by a called party number. An application module associated with a mobile station stores the received called party number at an attached Subscriber Identity Module (SIM) card. After determining that the mobile station has traveled into the designated home zone, the application module retrieves the stored called party number and automatically originates an outgoing call towards the called party number. By waiting until the mobile station has entered the home zone, the resulting call connection avoids additional air time charges.

21 Claims, 7 Drawing Sheets

AUTOMATIC CALL GENERATOR WITH A MOBILE TELECOMMUNICATIONS NETWORK BASED UPON MOBILE SUBSCRIBER'S LOCATION

BACKGROUND OF THE INVENTION

1. Technical Field of the Invention

The present invention relates to a mobile telecommunications network and, in particular, to a feature application module within a mobile station for automatically originating a call.

2. Description of Related Art

With the introduction of the Global System for Mobile (GSM) communication and the Personal Communications System (PCS), the concept of wireline telephone service and wireless telephone service has changed drastically. Instead of assigning a telephone number for a particular geographic location, in accordance with the GSM or PCS, a telephone number is assigned towards a particular subscriber. As a result, each subscriber is associated with a Subscriber Identity Module (SIM) card. Using an SIM card, a mobile subscriber is able to store necessary mobile subscriber information in a detachable memory unit and freely associated it with any available mobile station. Such information includes a mobile subscriber's Mobile Station Integrated Service Digital Network (MSISDN) number, or other user specified information, such as preferred speed dialing lists or screening lists. By inserting a mobile subscriber's SIM card into a mobile station, the stored subscriber information in the inserted SIM card is available to the mobile subscriber's new terminal. As a result, the mobile subscriber is able to freely utilize any available mobile station while maintaining the same MSISDN number and subscriber feature data.

Furthermore, in order to enable the mobile subscriber to utilize the mobile station as a cordless phone while traveling within a certain geographic location, the concept of "home zone" has been introduced. If the mobile subscriber makes a call within his home zone, the mobile station functions as a conventional cordless phone and the mobile subscriber is not charged for the air time, or is charged at a significantly lower air time rate. Accordingly, within his home zone, the mobile subscriber can utilize his mobile station to originate outgoing calls without incurring expensive air time charges and without physically using a different telephone terminal, e.g., wireline terminal such as a cordless phone.

With a conventional cordless terminal, a radio frequency range between the serving base unit and the cordless terminal is rather limited. Consequently, a subscriber is not able to travel out of the immediate vicinity of the base unit and make outgoing calls. However, with a PCS or GSM based telecommunications network, even if the mobile subscriber is within the home zone, the telecommunications service is still being provided by the same mobile switching center (MSC) serving that particular geographic location. With the conventional cordless system, it was the physical limitation that imposed the geographic boundaries of the service area. In contrast, within the GSM or PCS network, it is the logical limitation that imposes the geographic boundaries of the mobile subscriber's home zone. Accordingly, the home zone associated with a particular mobile subscriber can be much larger than what was previously available with the conventional cordless system.

Within the logical limitation imposed by the mobile service provider, the mobile subscriber is freely able to travel and utilize his mobile service without incurring expensive air time charges. This logical limitation may include only a few blocks from his home, or a radius of half mile, for example, covering a certain location. Once the mobile subscriber travel outside of his home zone, regular air time billing resumes.

In order to enable the mobile subscriber to determine the charging status, the mobile station displays a message indicating whether the mobile station is within the home zone or not. If the mobile subscriber is outside of his home zone area and does not want to incur any additional air time charges, the mobile subscriber has to wait until he travels into his home zone to initiate an outgoing call. However, this implies that the mobile subscriber has to periodically check his mobile station's display to ascertain his home zone status and manually dial the desired outgoing number after verifying that he is within the home zone. This implementation is inefficient and inconvenient for the mobile subscriber who has to continuously monitor the display.

Accordingly, there is a need for a mechanism to enable a mobile station to automatically originate an outgoing call to a desired called number previously input to the mobile station once the mobile station enters the mobile subscriber's designated home zone.

SUMMARY OF THE INVENTION

The present invention discloses a method and apparatus for automatically initiating an outgoing call from a mobile station within a Public Land Mobile Network (PLMN). After receiving a called number and an indication from the mobile subscriber to originate an outgoing call, the mobile station automatically stores the dialed called party number if the mobile station is located outside of the mobile subscriber's designated home zone. Thereinafter, the mobile station monitors the control channel to determine if the mobile station has traveled into the mobile subscriber's home zone. In response to an affirmative determination that the mobile station has traveled into the designated home zone, the mobile station retrieves the previously stored called party number from its memory register, e.g., a Subscriber Identity Module (STM) card, and automatically originates an outgoing call request towards the serving base station controller (BSC).

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
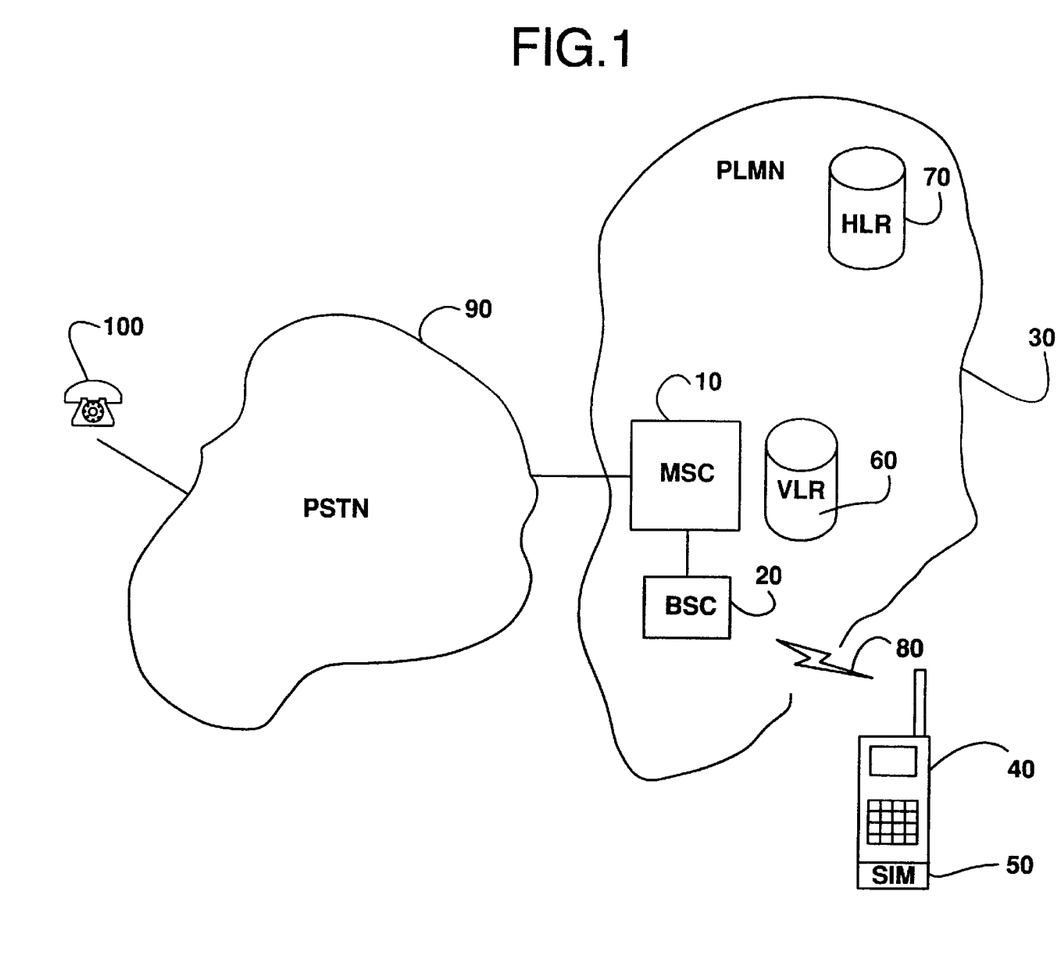
FIG. 1 is a block diagram of a mobile switching center (MSC) and a base station controller (BSC) within a Public Land Mobile Network (PLMN) providing mobile service to a mobile station.

FIG. 1 is a block diagram of a mobile switching center (MSC) 10 and a base station controller (BSC) 20 within a Public Land Mobile Network (PLMN) 30 providing mobile service to a mobile station 40. Attached to the mobile station 40 is a subscriber identity module (SIM) card 50 storing subscriber specific information. Such information includes the Mobile Station Integrated Service Digital Network (MSISDN) number identifying the mobile subscriber and other subscriber related data including, for example, preferred speed dialing lists and screening lists. In accordance with the Global System for Mobile (GSM) or Personal Communications System (PCS) standards, by inserting a mobile subscriber's SIM card into a mobile station, the stored subscriber information in the inserted SIM card 50 is available to the mobile subscriber's new terminal. As a result, the mobile subscriber is able to freely utilize any available mobile station while maintaining the same MSISDN number and subscriber feature data.

Whenever the mobile station 40 associated with the SIM card 50 travels into a particular mobile switching center (MSC) coverage area, a visitor location register (VLR) 60 associated with the serving MSC 10 copies into its memory the relevant subscriber information from the home location register (HLR) 70 associated with that particular mobile subscriber. Thereinafter, whenever the mobile station 40 originates an outgoing call, the radio signal 80 requesting an outgoing call setup is received by the base station controller (BSC) 20 connected to the serving MSC 10. The received request is then forwarded to the serving MSC 10, which in turn, processes the call setup request with the help of the subscriber information stored in the VLR 60. If the outgoing call connection is towards a wireline terminal 100, the call setup signal, such as an Initial Address Message (IAM) signal, is then transmitted from the serving MSC 10 to the connected Public Switched Telephone Network (PSTN) 90 to establish the call connection.

Whenever the mobile station 40 makes an outgoing call, there are basically two different types of charges that are incurred for that resulting call connection. First, the mobile subscriber using the mobile station 40 is charged with the actual connection between the serving MSC 10 and the called party number. For example, if a call to a called party number, such as the wireline terminal 100, constitutes a long distance call, appropriate long distances charges will be levied to the mobile subscriber's subscription for the call connection between the serving MSC 10 and the wireline terminal 100. Second, the mobile subscriber is further charged with air time charges for providing radio connection 80 between the mobile station 40 with the serving MSC 10 via the BSC 20. Accordingly, for mobile subscribers, there are dual charges for each call connection. On the other hand, if an outgoing call is originated from a wireline terminal, only the first type of call connection charges are incurred by the subscriber. As a result, in order to avoid incurring the above dual charges, most subscribers avoid using a mobile station if a wireline terminal is readily available.

Figure 2:
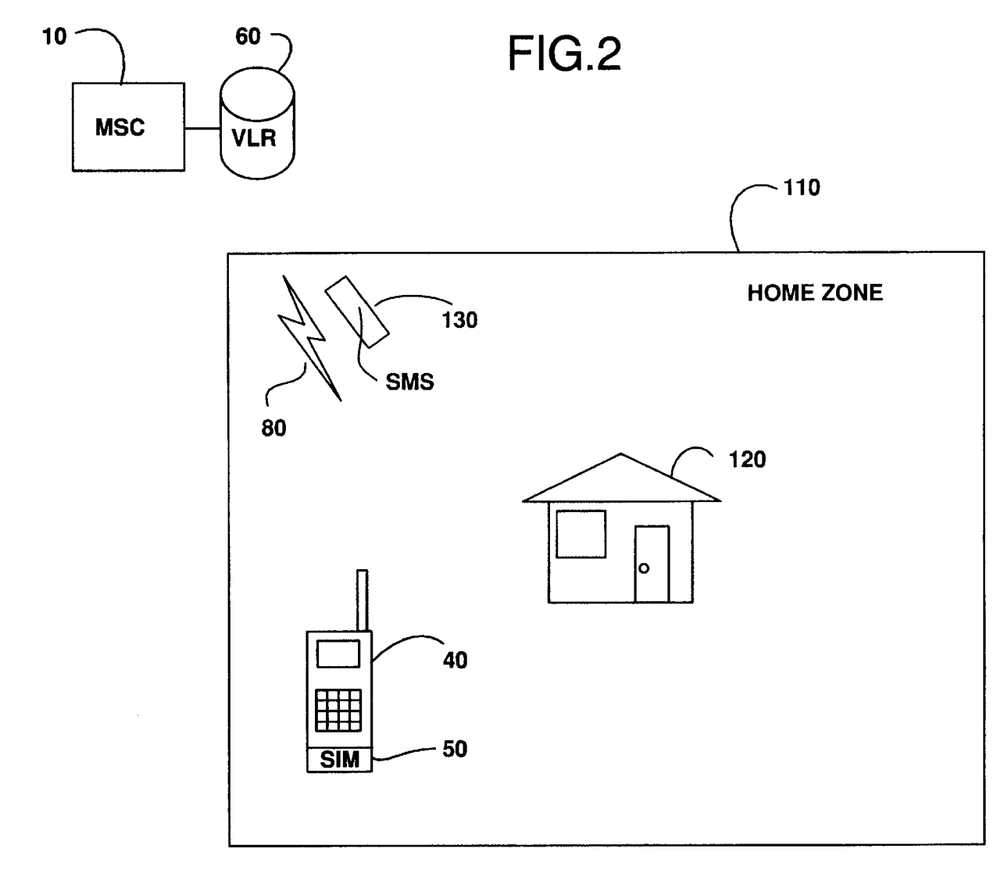
FIG. 2 is a block diagram of a mobile station originating an outgoing call while traveling within a home zone associated with that particular mobile subscriber.

In order to eliminate such charging distinctions between a wireline terminal and a mobile station, the concept of "home zone" has been introduced. Reference is now made to FIG. 2 where a block diagram of the mobile station 40 originating an outgoing call while traveling within a home zone 110 associated with that particular mobile subscriber is shown. A register, such as the SIM card 50, stores information representing the mobile subscriber's designated home zone. Such information can also be stored within the network and transmitted to the mobile station during a location update. Periodically, the mobile station 40 receives a location data 130 over one of the control channels indicating in which zone the mobile station is currently located. Such location data include a Short Message Service (SMS) Cell Broadcast (CB) signal. The cell identification data may also be communicated over a Broadcast Control Channel (BCCH). It can also be communicated using a Short Message Service or Unstructured Supplementary Service Data (USSD) message over a Stand Alone Dedicated Control Channel (SDCCH). The mobile station compares the zone information received over the control channel with the stored home zone information in the SIM card 50. If there is a match, the mobile station determines that it is within the mobile subscriber's home zone and displays a message accordingly informing the mobile subscriber.

For all calls 80 originated from or terminated by the mobile station 40 while traveling within the home zone, the air time charges can be free or charged at a significantly lower rate. As an illustration, the mobile subscriber can make an agreement with the mobile service provider to designate a few blocks around his house 120 as his home zone 110. After making such an agreement, the mobile subscriber utilizes his mobile station 40 more as a conventional cordless phone. The mobile subscriber still has to pay for the PSTN connection charges, but the radio connection charges to the serving MSC 10 are either free or charged at a significantly lower rate. Once the mobile station 40 travels outside of the designated home zone 110, normal air time charges resume.

Accordingly, the purpose of home zone is to provide a pocket of geographic area around the mobile subscriber's home or business where the mobile subscriber is able to utilize his telecommunications service without incurring expensive air time charges. This prevents the mobile subscriber from switching to a different wireline terminal whenever he is at home or work and avoids maintaining two different bills and telephone numbers.

Figure 3:
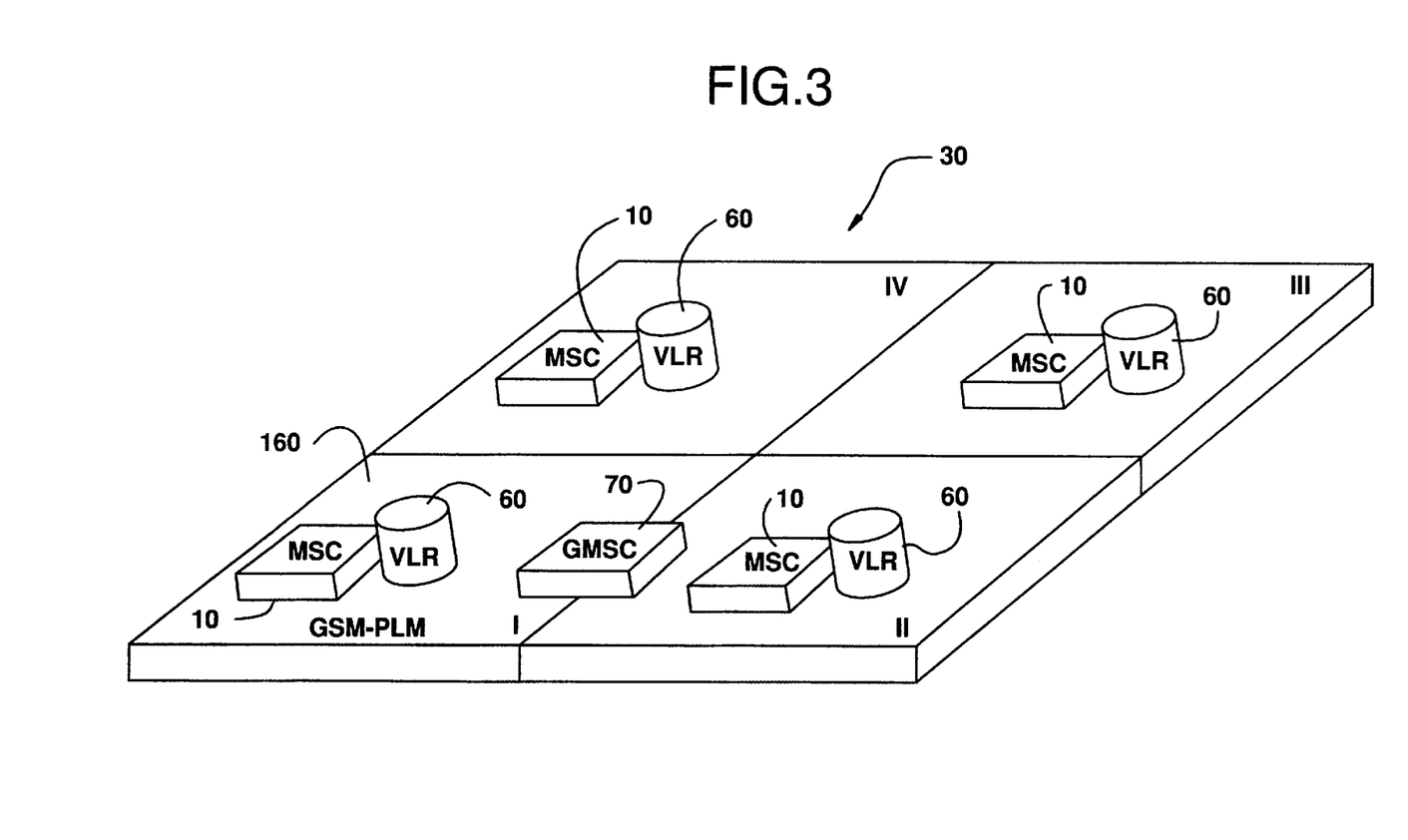
FIG. 3 is a diagram illustrating a single Public Land Mobile Network (PLMN) further comprising multiple Mobile Switching Center (MSC) areas.

Reference is now made to FIG. 3 where a layout of multiple MSC areas 160 within a particular PLMN 30 is illustrated. A PLMN network 30 is a complex configuration comprising multiple MSCs 10, VLRs 60, HLRs (not shown in FIG. 3) Gateway MSC 70 (GMSC), etc. In order to properly switch a call to a mobile station located within a particular PLMN, the correct entities need to be invoked and involved in a call process. The individual PLMN 30 may contain parts of one or more single Local Access Transport Areas (LATA). There are over three hundred LATAs presently defined throughout the United States. As shown in FIG. 3, within each LATA, there are one or more MSC/VLR areas 160 each being served by an individual MSC/VLR (usually there is a one-to-one relationship between a MSC 10 and its VLR 60 and is often referenced collectively as a MSC/VLR).

Figure 4:
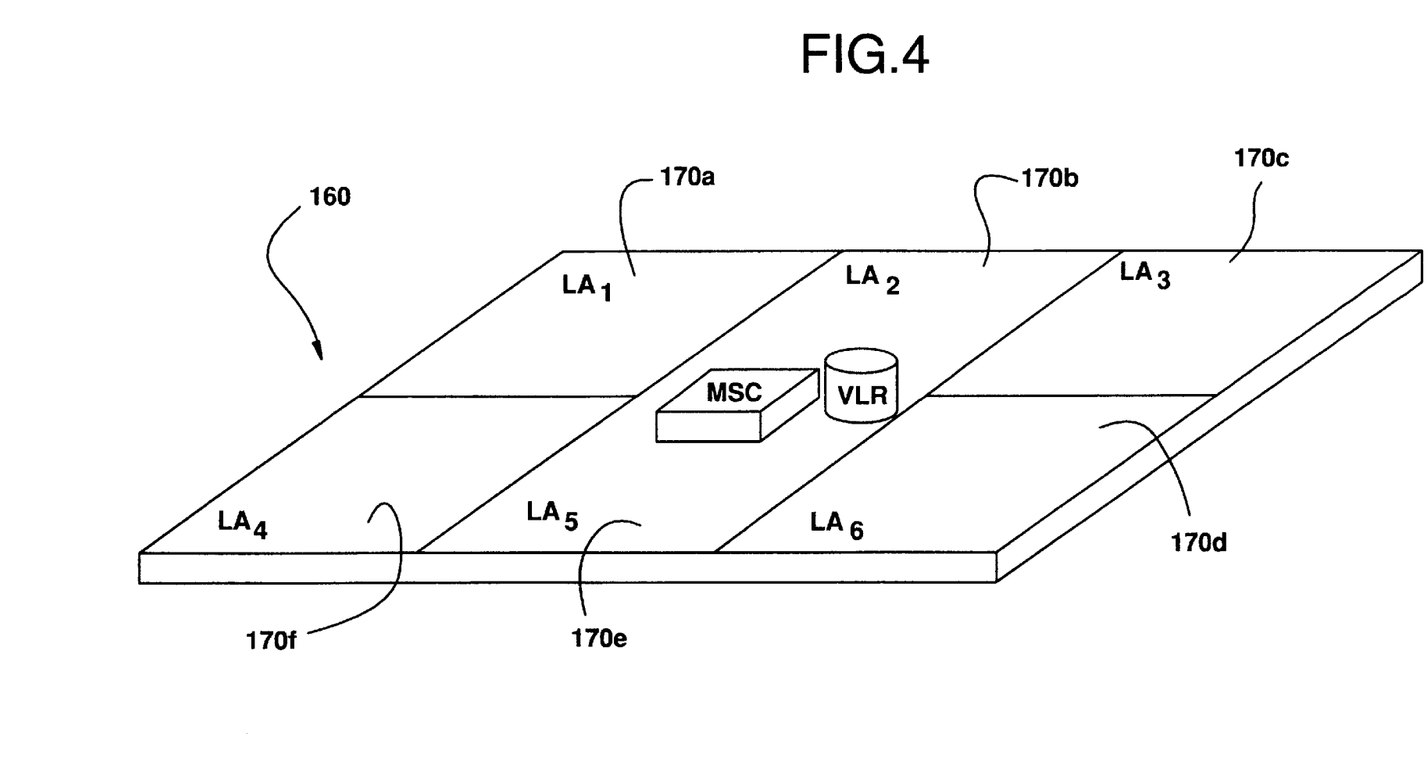
FIG. 4 is a diagram illustrating a single MSC further comprising multiple Location Areas (LA)

FIG. 4 illustrates multiple Location Areas 170a–170f within a particular MSC area 160. A Location Area is a part of the MSC service area in which a mobile station may move freely without updating location information to the MSC/VLR serving that Location Area. Therefore, a Location Area is the area where a paging message is broadcast to find the called mobile station. A Location Area Identity (LAI) which identifies each Location Area is used by the mobile network to search for a mobile station which is in an active state.

Figure 5:
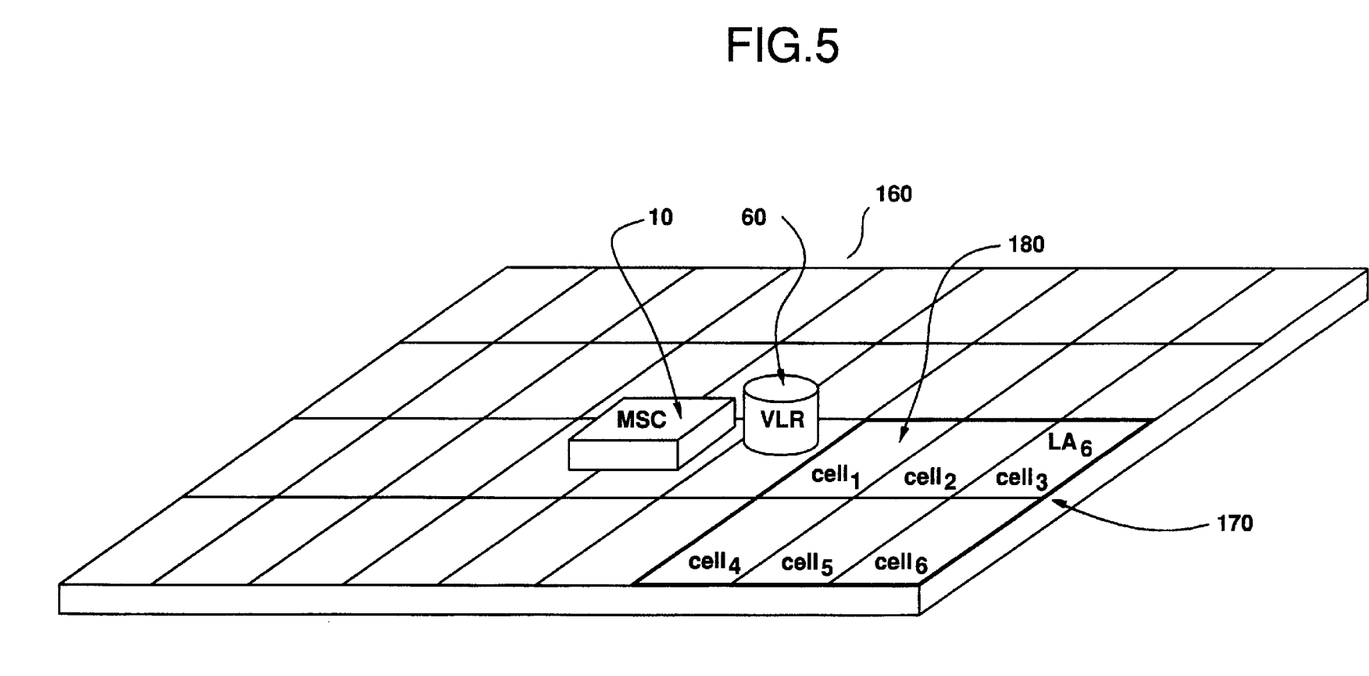
FIG. 5 is a diagram illustrating a single Location Area further comprising multiple Cell Areas.

Referring to FIG. 5, each Location Area 170 within a particular MSC coverage area 160 is further divided into multiple Cell Areas 180. Again, these Cell Areas within the Location Area 180 are served by the same MSC 10 and VLR 60. The serving mobile network identifies a particular radio coverage area known as a Cell Area using a Cell Global Identity (CGI). Different Cell Areas within a single Location Area are distinguished using a Cell Identity and Base Station Identity Code (BSIC) assigned to each serving base station.

Each mobile subscriber can make an agreement with the mobile service provider to designate any one of the above coverage areas to be his home zone. Typically, a cell area covering the mobile subscriber's home or work is designated as the home zone. As a result, as long as the mobile subscriber utilizes his mobile service within his designated cell area, his air time charges will be reduced.

For a subscriber who frequently travels in and out of his home zone, it is inconvenient for the mobile subscriber to manually verify whether he is located within the home zone or not. In order to not incur additional air time charges, the mobile subscriber is forced to inconveniently check the display unit and manually originate a call after visually determining that he has traveled into his home zone. Accordingly, there is a need for a mechanism to enable a mobile station to automatically originate an outgoing call once the mobile station enters the mobile subscriber's designated home zone.

Figure 6:
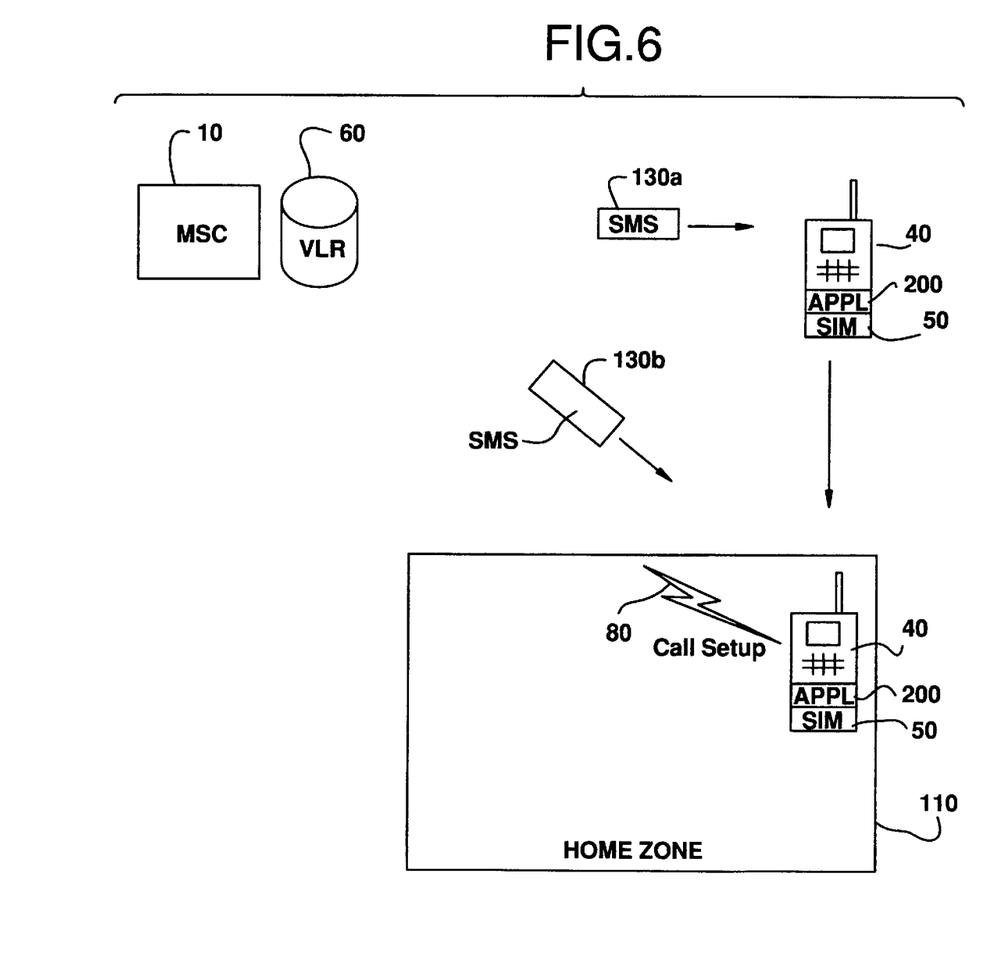
FIG. 6 is a block diagram illustrating an application module within a mobile station automatically originating an outgoing call towards a called party number once the mobile station travels into the designated home zone.

Reference is now made to FIG. 6 illustrating an application module 200 within a mobile station 40 automatically originating an outgoing call towards a called party number once the mobile station 40 travels into the designated home zone 110. As described previously, the serving MSC 10 and VLR 60 periodically transmits a control signal 130a informing the mobile station within its coverage area with the current zone information. The mobile station compares the received zone information with the home zone data stored in the attached SIM card 50. If there is no match, the mobile station determines that it is outside of the designated home zone. Such transmitted zone information may include the current Cell Global Identity (CGI) or Location Area Identity (LAI) associated with the current location. If the mobile subscriber dials an outgoing call while indicating that he does not want to incur additional air time charges, the mobile station 40 automatically stores the dialed called party number, for example, within its attached SIM card 50. Thereafter, the mobile station 40 continuously monitors the control channel to determine whether the mobile station 40 has traveled into the mobile subscriber's designated home zone 110. As soon as the mobile station 40 travels into the designated home zone 110, the mobile station 40 receives different location data, such as a SMS CB signal 130b, from the serving MSC notifying the mobile station of its new location. Upon determining that the received zone information matches the stored home zone information, the application module 200 within the mobile station 40 automatically retrieves the previously stored called party number and originates an outgoing call setup request over the radio link 80. As a result, a call connection between the mobile station 40 and the called party number is automatically established without incurring additional air time charges.

As an alternative, the serving MSC 10 can instead determine whether the mobile station 40 is within its home zone area. Without periodically transmitting location data to the mobile station, whenever the mobile station 40 enters its home zone area, the serving MSC transmits a signal notifying the mobile station 40 of its new charging status. Such signal can be transmitted using a number of existing signal protocols and may include SMS or USSD messages, or signal transmitted over a Broadcast Control Channel (BCCH). Upon receiving the indication from the serving MSC that the mobile station is currently within its assigned home zone, the mobile station automatically retrieves the previously entered directory number and originates an outgoing call.

Figure 7:
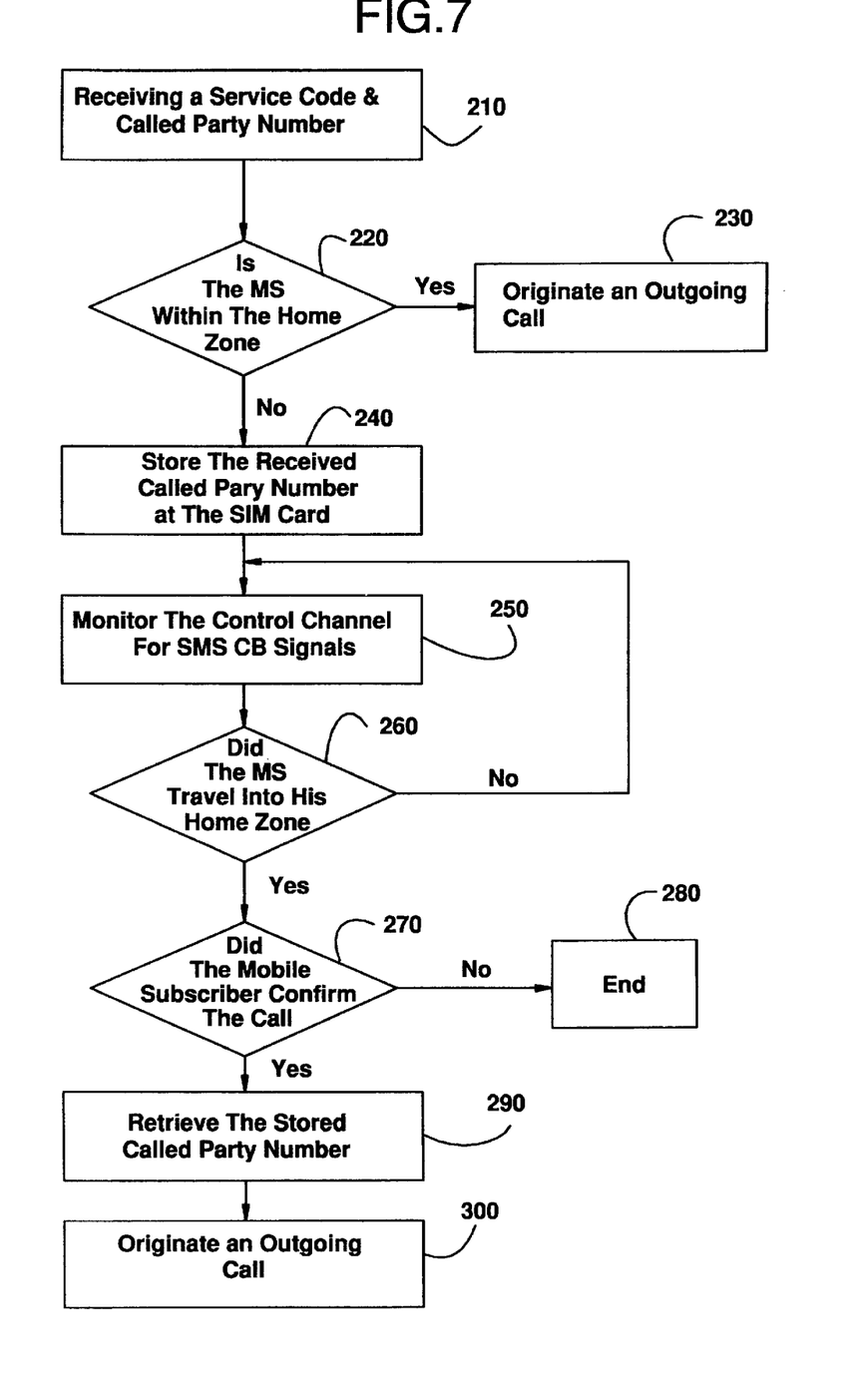
FIG. 7 is a flowchart illustrating the steps taken by the application module to automatically originate a call once the mobile station travels into the designated home zone.

FIG. 7 is a flowchart illustrating possible steps taken by the application module to automatically originate an outgoing call once the mobile station travels into the designated home zone. Whenever the mobile station receives from the subscriber an appropriate service code followed by a called party number at step 210, the mobile station determines whether the mobile station is located within the mobile subscriber's home zone. Such a determination can be made at step 220 by comparing the lastly received SMS CB zone information with home zone data stored in the SIM. Alternatively, if the serving MSC is maintaining the home zone status, such a determination simply requires the mobile station to ascertain if an appropriate signal has been received from the serving MSC informing the mobile station of its home zone status. Accordingly, if the mobile station is currently within the home zone, an outgoing call setup request with the received called party number is immediately generated by the mobile station at step 230. Otherwise, the received called party number is stored within a memory in the attached SIM card at step 240. Thereinafter, the application module associated with the mobile station continuously monitors the control channel to determine if the mobile station has traveled into the designated home zone at step 250. If a subsequently received SMS CB signal does not indicate that the mobile station has traveled into the home zone at step 260, the application module continues monitoring the channel until the correct SMS CB is received. Once an SMS CB signal with zone information corresponding to the home zone data stored in the SIM is received by the mobile station, as an option, the mobile station may request a confirmation from the mobile subscriber to initiate the outgoing call at step 270. Such a request can be displayed on the display unit and the user indication accepted via the attached keypad. The request may also include a special tone to alert the mobile subscriber. If the user rejects the confirmation, the outgoing call connection is abandoned at step 280. Otherwise, the application module retrieves the previously stored called party number from the SIM card at step 290. With the retrieved called party number, the application number then transmits an outgoing call setup request signal, such as a Direct Transfer Application Part (DTAP) signal, towards the serving MSC. As a result, a call connection between the mobile station and the specified called party terminal is established without incurring additional air time charges. Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for automatically originating an outgoing call connection from a mobile station within a mobile telecommunications system, wherein said mobile station is associated with a home zone, said method comprising the steps of:

receiving at said mobile station an indication from the mobile subscriber to originate an outgoing call towards a particular called party number;

initially determining whether said mobile station is currently within said home zone; and in response to an affirmative determination, transmitting from said mobile station a radio signal requesting an outgoing call connection towards said called party number;

otherwise storing said called party number within a memory associated with said mobile station;

periodically determining whether said mobile station has traveled into said home zone; and in response to an affirmative determination, retrieving said called party number from said memory; and transmitting from said mobile station a radio signal requesting an outgoing call connection towards said called party number.

2. The method of claim 1 wherein said indication includes a service code followed by said called party number.

3. The method of claim 1 wherein said mobile station further comprises a Subscriber Identity Module (SIM) card, and said step of storing said called party number comprises the step of storing said called party number within a memory associated with said SIM card.

4. The method of claim 1 wherein said step of periodically determining whether said mobile station has traveled into said home zone further comprises the steps of:

receiving a Short Message Service (SMS) Cell Broadcast (CB) over a control channel; and determining whether zone data included in said SMS CB is same as the home zone associated with said mobile station.

5. The method of claim 1 wherein said home zone comprises a Cell Area (CA).

6. The method of claim 1 wherein said home zone comprises a Location Area (LA).

7. The method of claim 1 wherein said home zone comprises a Public Land Mobile Network (PLMN) associated with said mobile station.

8. A method for originating a call connection request from a mobile station within a Public Land Mobile Network (PLMN), said mobile station being associated with a particular home zone location within said PLMN, said method comprising the steps of:

receiving at said mobile station a request to originate a call towards a called party number;

storing said called party number at a memory associated with said mobile station;

determining whether said mobile station is located within said home zone;

in response to an affirmative determination, transmitting a call connection request containing said called party number from said mobile station to a base station subsystem (BSS) serving said mobile station.

9. The method of claim 8 wherein said step of receiving said request further comprises the steps of:

determining that said mobile station is currently within said home zone; and transmitting a call connection request containing said called party number to a base station subsystem (BSS) serving said mobile station directly without storing said called party number.

10. The method of claim 9 wherein said step of receiving said request comprises the step of first receiving a service code followed by said called party number.

11. The method of claim 8 wherein said mobile station further comprises a Subscriber Identity Module (SIM) card storing identification number representing said home zone, and said step of determining whether said mobile station is within said home zone further comprises the step of receiving a Short Message Service (SMS) including Cell Broadcast information over a control channel.

12. The method of claim 11 wherein said step of determining whether said mobile station is within said home zone further comprises the step of comparing said Cell Broadcast information with said identification number stored in said STM card.

13. The method of claim 8 wherein said mobile station further comprises a Subscriber Identity Module (SIM) card, and said step of storing said called party number comprises the step of storing said called party number at said SIM card.

14. The method of claim 8 wherein said step of transmitting said call connection request by said mobile station further comprises an initial step of receiving a confirmation from a mobile subscriber to originate the call.

15. A system for originating a call connection request from a mobile station within a Public Land Mobile Network (PLMN), said mobile station associated with a particular location within said PLMN as a home zone, said system comprising:

means for receiving at said mobile station a request to originate a call towards a called party number;

means for storing said called party number at a memory unit associated with said mobile station;

means for receiving a signal over a control channel identifying the current location of said mobile station;

means for determining whether said current location is the same as said home zone;

in response to an affirmative determination, means for transmitting a call connection request containing said called party number from said mobile station to a base station subsystem (BSS) serving said mobile station.

16. The system of claim 15 wherein said means for receiving said request further comprises:

means for determining that said mobile station is currently within said home zone; and means for directly transmitting a call connection request with said called party number to a base station subsystem (BSS) serving said mobile station.

17. The system of claim 15 wherein said means for receiving said request comprises means for receiving a service code followed by said called party number.

18. The system of claim 15 wherein said mobile station further comprises a Subscriber Identity Module (SIM) card, and said means for storing said called party number comprises means for storing said called party number at said SIM card.

19. The system of claim 15 wherein said mobile station further comprises a Subscriber Identity Module (SIM) card storing identification number representing said home zones and said means for receiving said signal over said control channel comprises means for receiving a Short Message Service (SMS) including Cell Broadcast information.

20. The system of claim 19 wherein said means for determining whether said current location is said home zone further comprises means for comparing said Cell Broadcast information with said identification number stored in said SIM card.

21. The system of claim 15 wherein said means for transmitting said call connection request by said mobile station further comprises means for receiving a mobile subscriber confirmation to originate the call.

* * * * *